Aug. 20, 1946.
C. HOLLERITH
2,405,954
WHEEL
Filed March 16, 1944
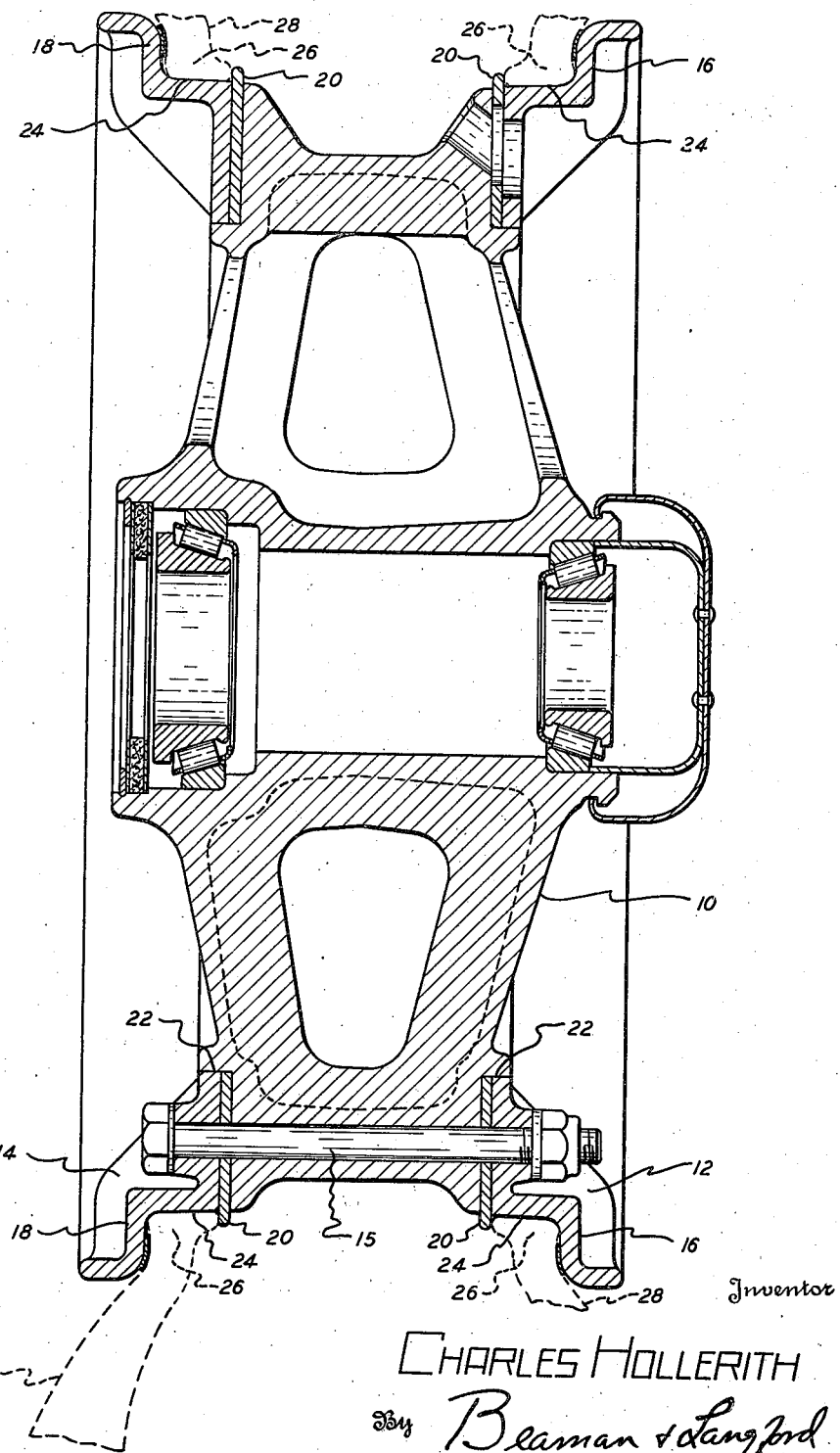
Inventor
CHARLES HOLLERITH
By Beaman & Langford
Attorneys Patented Aug. 20, 1946

2,405,954

UNITED STATES PATENT OFFICE 2,405,954

WHEEL

Charles Hollerith, Jackson, Mich., assignor, by mesne assignments, to The B. F. Goodrich Company, Akron, Ohio, a corporation of New York Application March 16, 1944, Serial No. 526,699

1 Claim. (Cl. 152—381)

The present invention relates to wheel structure for pneumatic tires of the type in which provisions are made for securing the tire in position upon the wheel in the event of deflation while in service.

One of the objects of the present invention is to provide an improved safety wheel and tire assembly.

Another object of the invention is to provide an improved tire and wheel assembly of the type described which is characterized by the ease with which the tire may be mounted and demounted.

Another object of the invention is to provide a tire and wheel assembly of the type described in which the beads of the pneumatic tire are held in extended position adjacent the tire retaining flanges of the rim in the event of sudden deflation by removable members.

These and other objects and advantages residing in the wheel construction and the arrangement for accomplishing the objects of the present invention will be appreciated from a consideration of the following specification and the accompanying drawing, the invention being defined in the claim.

In the drawing is shown a vertical cross-sectional view through a wheel and tire assembly embodying the principles of the present invention.

The invention has been illustrated as applied to the nose wheel of an aircraft which in service is subjected to severe shock, oftentimes resulting in a blowout of the tire. Under certain conditions upon deflation the tire may be rolled off the wheel. It will be understood, however, that the principles of the present invention are not limited to aircraft wheels, but have application to wheels on all sorts of vehicles.

As shown, the wheel 10 has separate annular portions 12 and 14 defining the tire retaining rim flanges 16 and 18. Inserted between the sections 12 and 14 and the main body of the wheel 10 are separate ring members 20 which are piloted upon annular shoulders 22. Bolts 15 circumferentially spaced throughout the wheel structure hold the parts just described in rigid assembled relation. It will be noted that the radial dimension of the rings 20 are such that when piloted from the wheel 10 the outer peripheral portions thereof extend a considerable distance above the portions 24 upon which the bead 26 of the pneumatic tire 28 is supported. These projecting portions of the rings 20 back up the inside of the beads 26 and hold them in position upon the seats 24 in engagement with the flanges 16 and 18 at all times, irrespective of the state of inflation of the tire 28. To facilitate the assembly of the tire and wheel parts, the rings 20 may be sectional in construction. It should be readily apparent that the tire and wheel parts may be assembled and disassembled to prevent the necessity of stretching the beads 26 over the projections, retaining the same upon the seats 24 as is the case in wheel structure designed to form a similar function, but in which case the projections back of the tire bead are integral with the tire retaining rim of the wheel.

Having thus described my invention what I desire to secure by Letters Patent and claim is:

A drop center wheel for pneumatic tires comprising a drop center portion, annular flanges located on opposite sides of said drop center portion, annular rings piloted on said annular flanges and projecting above said drop center portion, the outer periphery of said rings being directly adjacent said drop center portion on opposite sides thereof, angular shaped annular tire retaining rim sections also piloted on said annular flanges, said rim sections having bead supporting seats adjacent said outer periphery of said rings, the outer periphery of said rings projecting radially beyond said seats to provide an abutment to support the tire beads on said seat and prevent displacement of the same into said drop center portion, and means for removably securing said rings and said rim sections on said annular flanges.

CHARLES HOLLERITH.